Figure 13:
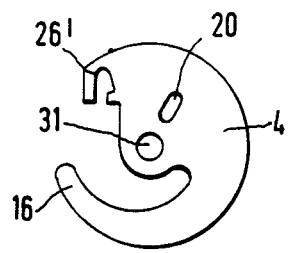

United States Patent [19]

Salice

[11] Patent Number: 4,582,446
[45] Date of Patent: Apr. 15, 1986

[54] CONNECTING FITTING FOR RELEASABLY CONNECTING TWO PLATELIKE FURNITURE MEMBERS

[75] Inventor: Luciano Salice, Carimate, Italy

[73] Assignee: Arturo Salice S.p.A., Novedrate, Italy

[21] Appl. No.: 386,571

[22] Filed: Jun. 9, 1982

[30] Foreign Application Priority Data

Jul. 14, 1981 [DE] Fed. Rep. of Germany ....... 3127795

[51] Int. Cl.⁴ ............................ B25G 3/00; F16B 9/00
[52] U.S. Cl. .................................... 403/245; 403/322; 403/407.1
[58] Field of Search .............. 403/231, 407, 405, 322, 403/245

[56] References Cited

U.S. PATENT DOCUMENTS

| | | | |
|---|---|---|---|
| 4,131,376 | 12/1978 | Busse | 403/231 X |
| 4,160,610 | 7/1979 | Austen-Brown et al. | 403/407 |
| 4,272,207 | 6/1981 | Lautenschlager | 403/407 X |

FOREIGN PATENT DOCUMENTS

| | | |
|---|---|---|
| 2541554 | 3/1979 | Fed. Rep. of Germany . |
| 2748272 | 5/1979 | Fed. Rep. of Germany . |
| 2836678 | 3/1980 | Fed. Rep. of Germany . |
| 2909656 | 9/1980 | Fed. Rep. of Germany . |
| 2908475 | 10/1981 | Fed. Rep. of Germany . |

*Primary Examiner*—Andrew V. Kundrat
*Attorney, Agent, or Firm*—Fleit, Jacobson, Cohn & Price

[57] ABSTRACT

A connecting fitting for releasably connecting two platelike furniture members, which preferably extend at right angles to each other, comprises two fitting elements which are adapted to be secured to respective ones of the furniture members to be connected. One of said fitting elements has locking projection and is adapted to be slidably inserted into a receiving opening of the other fitting element until the fitting elements and/or furniture members engage each other. The other fitting element is provided with a hook-shaped rotary wedge for interengaging with the projection so as to lock the fitting elements to each other. The rotary wedge is rotatably mounted in a wedge housing and is biased in a locking sense by a torsion spring. Unlocking means are provided to rotate the rotary wedge in a retracting sense as well as resilient means for locking the rotary wedge in its retracted position. These resilient means are arranged to release the rotary wedge in response to the insertion of the projection of the other fitting element.

35 Claims, 60 Drawing Figures

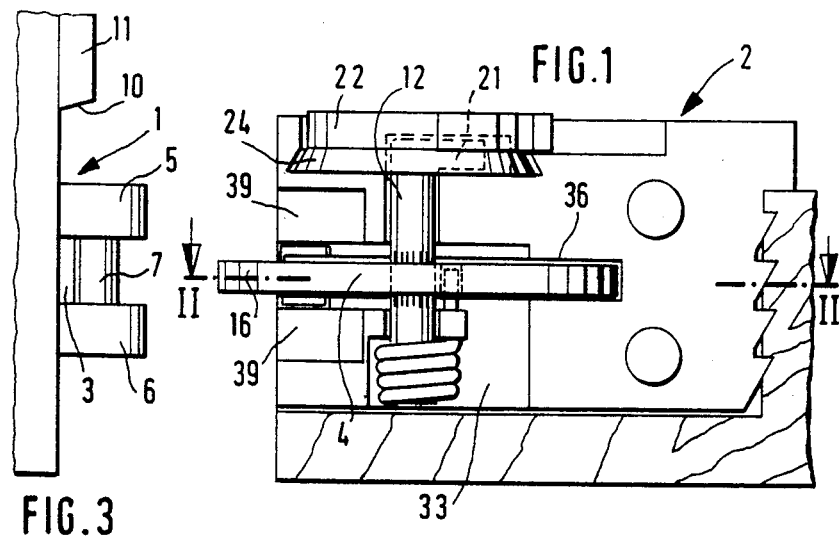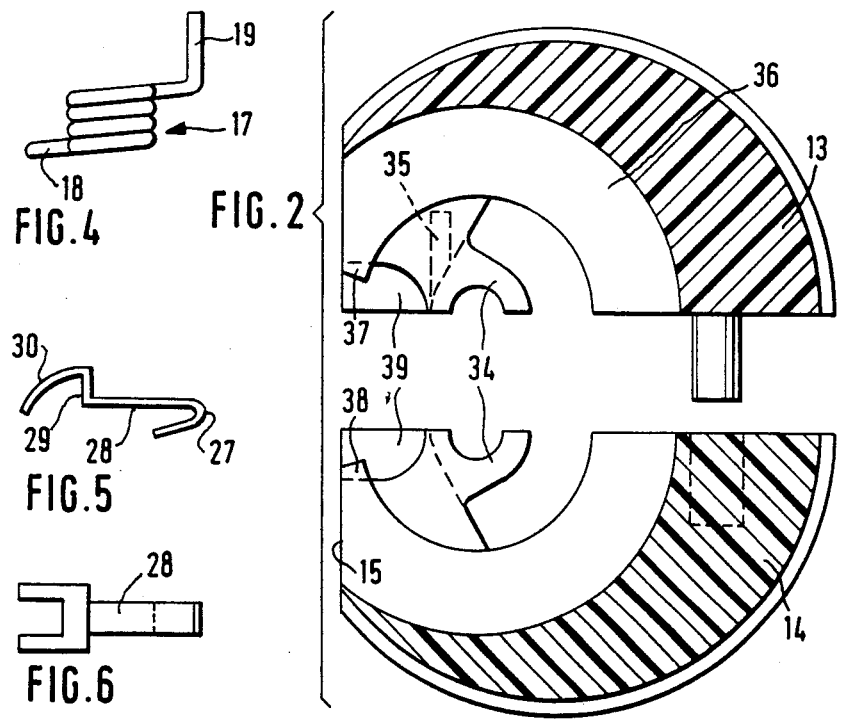

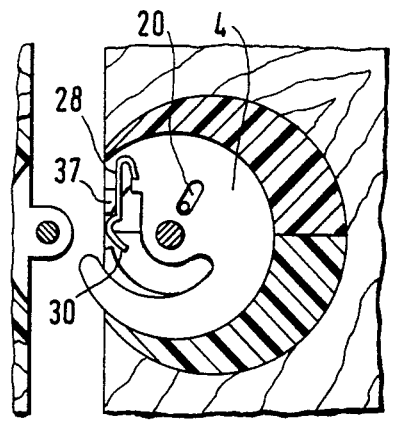
FIG.7
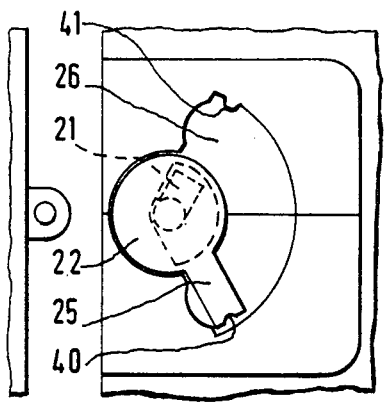
FIG.8
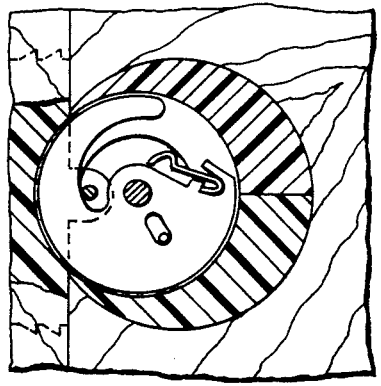
FIG.9
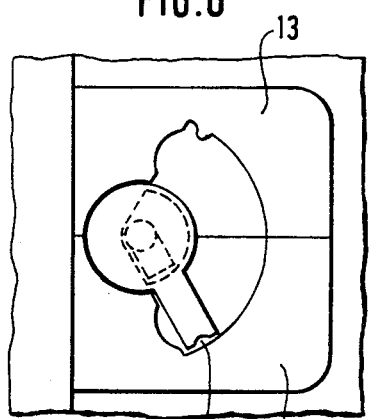
FIG.10
FIG.11
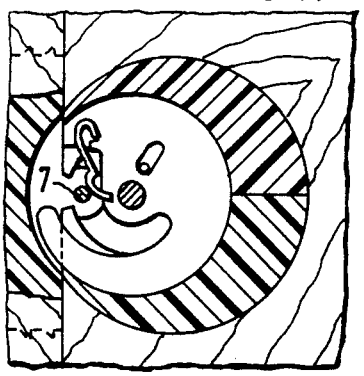
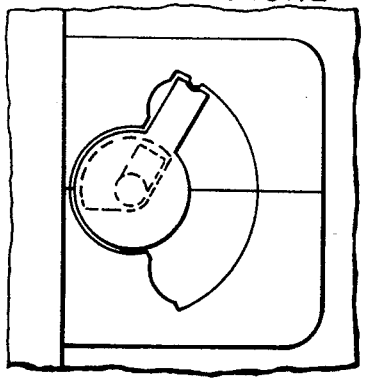
FIG.12

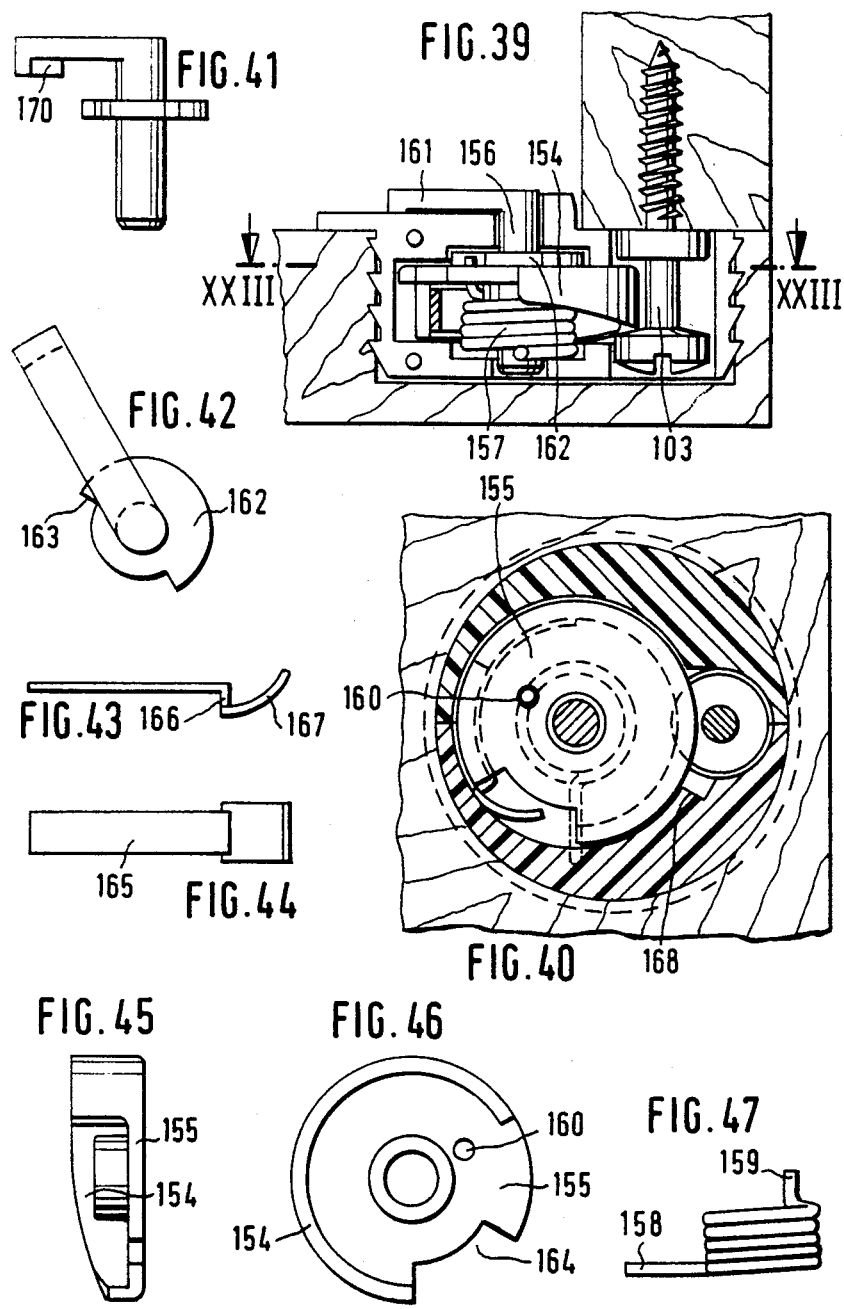

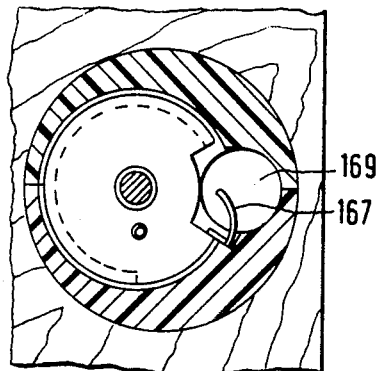
FIG. 48
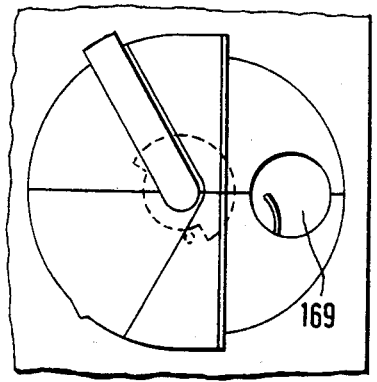
FIG. 49
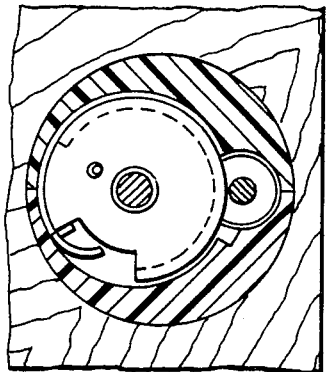
FIG. 50
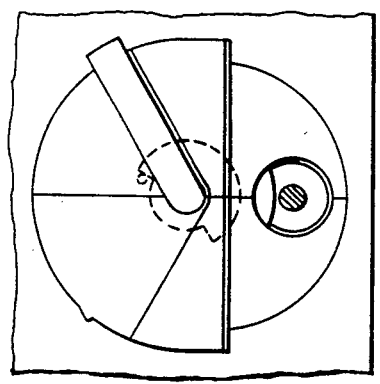
FIG. 51
FIG. 52
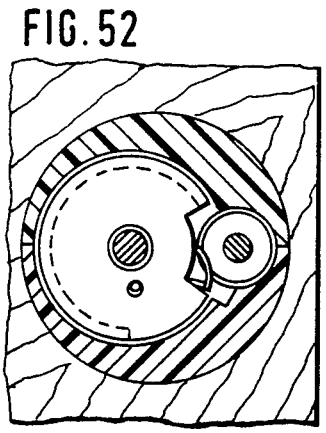
FIG. 53
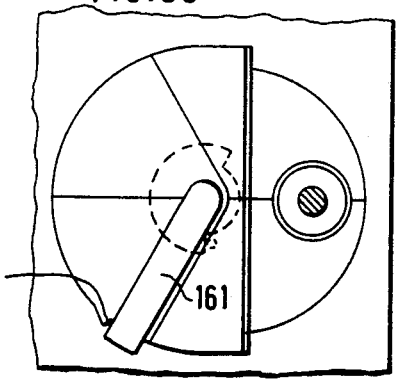

FIG.54
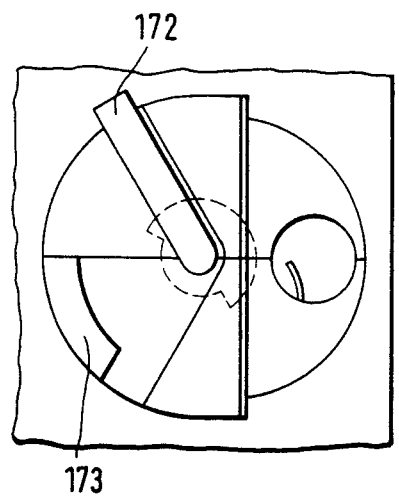
FIG.55
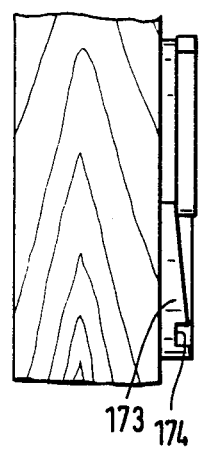
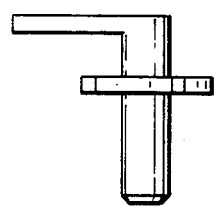
FIG.56

CONNECTING FITTING FOR RELEASABLY CONNECTING TWO PLATELIKE FURNITURE MEMBERS

This invention relates to a connecting fitting for releasably connecting two platelike furniture members, which preferably extend at right angles to each other, comprising two fitting elements which are adapted to be secured to respective ones of the furniture members to be connected, wherein one of said fitting elements has a locking projection and is adapted to be slidably inserted into a receiving opening of the other fitting element until the fitting elements and/or furniture members engage each other, and the other fitting element is provided with a hook-shaped rotary wedge for interengaging with the projection so as to lock the fitting elements to each other.

Connecting fittings comprising a rotatably mounted rotary wedge, which can be rotated by means of a screwdriver or the like in order to interconnect the fitting elements, are known, e.g., from Laid-open German Application Nos. 29 09 656, 29 08 475, 25 41 554, 28 36 678 and 27 48 272. The known connecting fittings have the disadvantage that they can be mounted only with difficulty and a screw driver or another tool for interconnecting the fitting elements and, if desired, for forcing them against each other, is always required in order to assemble the fitting elements.

Laid-open German Application No. 22 06 684 discloses a connecting fitting which comprises a wedge or rotary wedge, which is spring-loaded and to tighten the assembly is forced behind the enlarged head of the pin-shaped second fitting element. Before the pin is inserted, the wedge or rotary wedge assumes a position which said wedge is pushed back from the receiving opening and is retained by a stop formed by a step of the housing. The wedge or rotary wedge has a web, which in this positon lies in the receiving opening and which is engaged by the head of the pin as the latter is inserted so that the wedge or rotary wedge is then pushed away from its stop and is thus released. That known connecting fitting has a complicated structure and has the disadvantage that it can be disassembled only with difficulty if a piece of furniture is to be disassembled.

It is an object of the invention to provide a connecting fitting which is of the kind described first hereinbefore and has fitting elements which permit a simple assembling of the furniture members connected to said fitting elements and which can easily be separated when the piece of furniture is to be disassembled.

In accordance with the invention this object is accomplished in that the rotary wedge is rotatably mounted in a wedge housing and is biased in a locking sense by a torsion spring, and that unlocking means are provided to rotate the rotary wedge in a retracting sense as well as resilient means for locking the rotary wedge in its retracted position, which resilient means are arranged to release the rotary wedge in response to the insertion of the projection of the other fitting element. The connecting fitting according to the invention can be assembled in a simple manner and without a tool in that the rotary wedge is held in its retracted position while the fitting elements are assembled and is subsequently released so that the spring urges the rotary wedge to its locking position in which the rotary wedge connects the fitting elements and forces them against each other by its wedge action.

The unlocking means for retracting the rotary wedge consist suitably of a lever, which is secured to the pin and extends at right angles thereto and lies on the upper surface of the top wall of the wedge housing. According to a further preferred feature of the invention, a disc provided with a handle lever is pivoted in the top wall of the wedge housing and is centered on the axis of the pin and has a sector-shaped recess, which extends over the lever, which is secured to the pin. The angle included by the sector is approximately as large as the angle through which the short lever secured to the pin is moved when the rotary wedge springs from its rectracted position to its locking position. When the handle lever connected to the disc is moved in an unlocking sense, the lever that is secured to the pin will be carried along in the unlocking sense by one side face of the sector-shaped aperture. When the rotary wedge is held in its retracted position by locking means, then the disc can be turned by the handle lever to that position which corresponds to the locking position of the rotary wedge; this movement will not be transmitted to the rotary wedge. When the locking means are then disabled as the fitting elements are pushed together, the rotary wedge will be free to spring to its locking position. For this reason a further preferred feature of the invention resides in that locking means are provided for locking the rotary wedge in its retracted position and said locking means are arranged to be disabled in response to the insertion of the projection of the other fitting element. Said locking means suitably comprise a leaf spring, which is secured at one end to the rotary wedge and at its other end has a hook-shaped portion, which in the retracted position of the rotary wedge snaps behind a protruding portion of the housing. The hook-shaped portion may be provided with an outwardly extending tag, which extends in the opening that is formed in the other fitting element and adapted to expose the projection so that the hook-shaped portion will be disengaged from the housing as the other fitting element is inserted and engages said tag.

According to a further preferred feature of the invention, the disc provided with the handle lever is provided with a beveled edge and is rotatably mounted in a mating undercut groove formed in the top wall of the wedge housing, the handle lever connected to the disc extends in a sector-shaped recess formed in the top surface of the wedge housing, and the handle lever is formed at one end with a recess, which in the retracted position of the rotary wedge receives a projecting cam that is provided at the peripheral edge of the sector-shaped recess. In order to separate the fitting elements of the connecting fitting, the handle lever can be caused to interlock with the cam so that the fitting elements can then be pulled apart in a simple manner. When it is desired to interconnect the fitting elements, the rotary wedge and is held in its retracted position by the locking means which are disposed in the path along which the other fitting element is slidably inserted. As a result, the rotary wedge will spring to its locking position when the other fitting element has been slidably inserted, provided that the handle lever connected to the disc has been swung back before so that it will not obstruct the movement of the rotary wedge to its locking position.

By the fitting elements which are to be connected, the furniture member which is to be carried by another should not only be forced with its end face against the carrying furniture member but should be secured to the latter so as to prevent a displacement of the carried furniture member transversely to its own plane or in the plane of the carrying furniture member. That displacement is usually prevented in that the furniture members to be connected are provided with interengaging steps or with pins which extend into mating openings in the other member. But these special supporting means required in addition to the tightening rotary wedge joint involve an additional expenditure, which adds to the cost of the connecting fittings.

In order to provide a particularly simple connecting fitting, which can easily be assembled and connects the furniture members without need for additional pin joints, a further preferred feature of the invention resides in that that fitting element which has an interengageable projection consists of a pin, which has an enlarged head, and the rotary wedge consists of two discs, which extend in spaced apart, parallel planes and are provided with prings, which are curved along arcs of a circle and straddle the shank of the pin behind the head and are supported on and forced against the rear face of the head. By this connecting fitting according to the invention, the furniture members to be connected are forced against each other and the rotary wedge will straddle the headed shank of the fitting element so that the carried furniture member will be secured to the carrying furniture member in such a manner that a displacement which is transverse to the planes of the discs of the rotary wedge will be prevented. The fitting element consisting of a pin having an enlarged head can be secured in a particularly simple manner and may simply be screwed into the furniture member if the pin is provided with screw threads.

The step which is formed on the pin between the head and the shank is suitably conical or convex so that the head can be engaged on its rear side with low friction by the pronglike rotary wedges, which are curved approximately along an arc or a circle.

According to a further preferred feature of the invention, the discs of the rotary wedge have circular edges and the rotary wedge is rotatably mounted in that said circular edges are guided in annular grooves of the pot-shaped housing which accommodates said discs. As the rotary wedge consists of two spaced apart discs, it can present an adequate resistance also to canting forces.

The rotary wedge is suitably a channel-shaped member made from a sheet metal stamping and the web which connects the discs of the rotary wedge suitably lies within the circular periphery so that the web will not obstruct the insertion of the edges of the rotary wedge into the annular grooves.

According to a further preferred feature of the invention the torsion spring consists of a coiled spring having an axis which coincides with the axis of rotation of the rotary wedge, one end leg of the torsion spring is held in an aperture of the housing and the other end leg is held at the rotary wedge.

According to a further preferred feature, one end of a leaf spring is secured in the housing and said leaf spring has a free portion, which is provided at its end with a hook and which is resilient in a plane that is parallel to the rotary wedge, the rotary wedge is provided with a pin or projection, which is adapted to interengage with the hook when the fitting element is in a ready position, in which the rotary wedge is retracted from the receiving opening, and an intermediate portion of the leaf spring is exposed in a sufficient length through the opening for receiving the head of the other fitting element so that the hook will release the pin or projection in response to the insertion of the head. The fitting elements can be assembled in a simple manner in that that furniture member to which the fitting element provided with the rotary wedge is secured is pushed onto the other fitting element consisting of the headed pin. The head will then disengage the hook from the rotary wedge so that the latter springs automatically to its locking position. An axial pin may be mounted in the top wall of the housing for the rotary wedge and said axial pin may carry the unlocking lever disposed on the top of the housing and may be provided at its lower end with a stop for cooperating with a stop of the rotary wedge in such a manner that the unlocking lever may be used to turn the rotary wedge to its retracted position, in which the fitting elements can be separated. When the fitting elements have been separated, the hooked leaf spring holds the rotary wedge in its retracted position so that the handle lever can then be rotated opposite to the unlocking sense whereas the rotary wedge will not spring to its locking position until the other fitting element has caused the hook to release the rotary wedge.

Instead of annular grooves in the inside surface of the housing, the means for mounting the rotary wedge may consist of a pin, which extends through the torsion spring. The rotary wedge may additionally be supported at its circular edges on the cylindrical inside surface of the housing so that a higher resistance will be presented to canting forces.

According to a further preferred feature of the invention the wedge housing has substantially the shape of an entire cylinder and is received by a bore, which is entirely provided in the edge portion of the furniture member that is to be secured, and the headed pin extends into the receiving opening through a bore in the land between the bore and the end face of the furniture. That embodiment is particularly suitable for relatively thick furniture members.

According to a further preferred feature of the invention a disc is rotatably mounted in the wedge housing on a mounting pin, which is parallel to the center line of the wedge housing, and said disc has a cylindrical side wall, which increases in height in wedge shape and constitutes the rotary wedge, which extends into the opening that is intended to receive the headed pin, which opening is parallel to the mounting pin. That embodiment may be used, e.g., to connect bottom plates to the lower end faces of vertical furniture walls.

In order to hold the disc provided with the rotary wedge in its ready position when the fitting elements are to be assembled, the disc may have a sector-shaped portion which is not provided with said side wall and which receives a radially outwardly extending, hook-shaped end of a leaf spring, which at its end opposite to the hook is secured to the cylindrical side wall, the housing has an inside surface, which surrounds the disc and is formed laterally of the receiving opening with a step, which is engageable by the lever in the ready position, and the hook has a tag, which extends laterally to be exposed through the receiving opening. As the other fitting element is slidably inserted into the receiving opening, the head of said other fitting element, which head has suitably a convex outside surface, will slide on said tag so as to disengage the hook from the disc and the rotary wedge will then spring to its locking position.

Further preferred features of the invention are described in the dependent claims.

Figure 14:
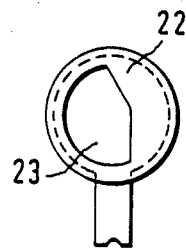
Figure 15:
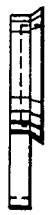
Figure 16:
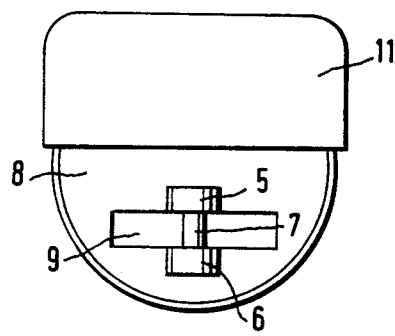
Figure 17:
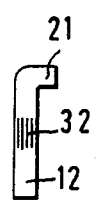
Figure 18:
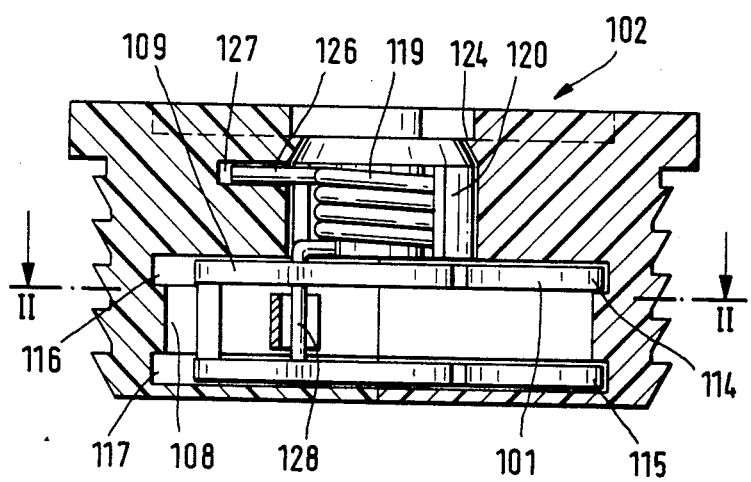
Figure 19:
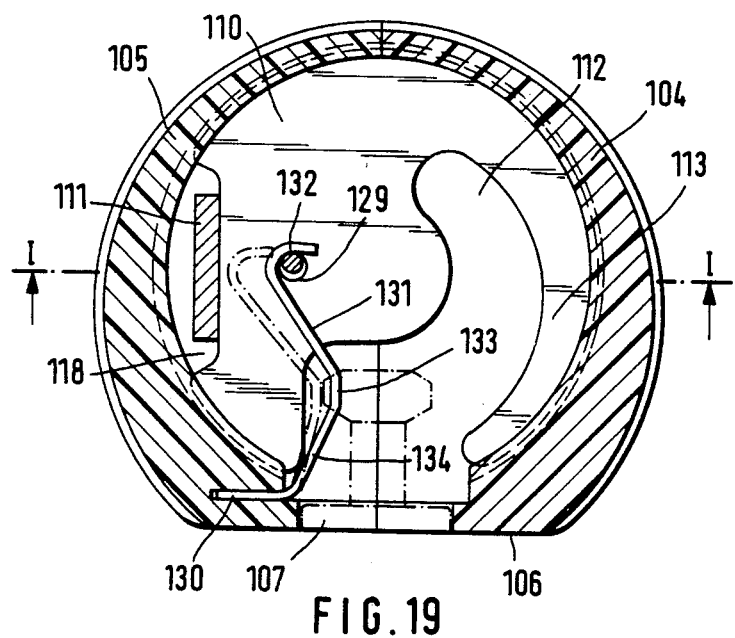
Figure 20:
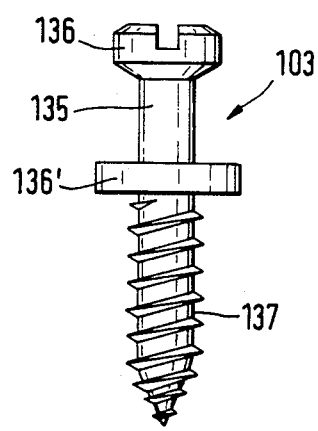
Figure 21:
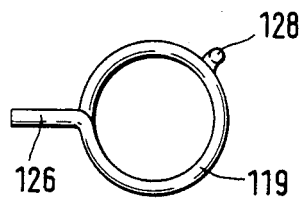
Figure 22:
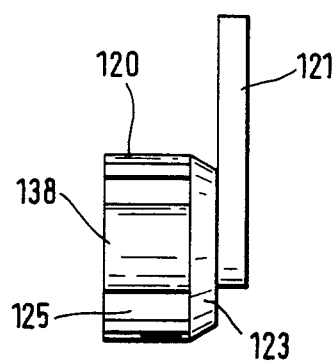
Figure 23:
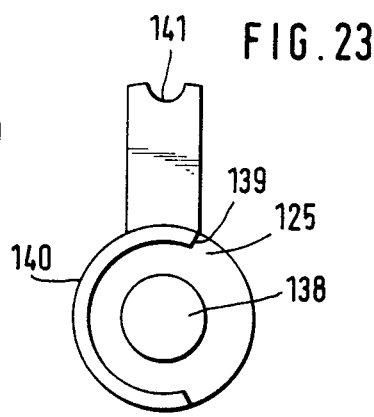
Figure 24:
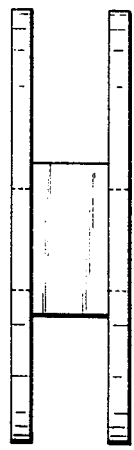
Figure 25:
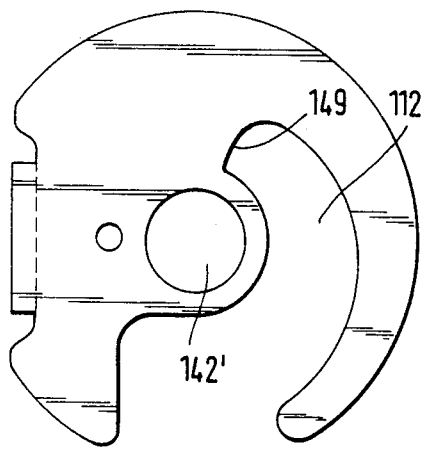
Figure 26:
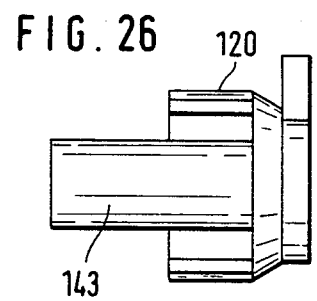
Figure 27:
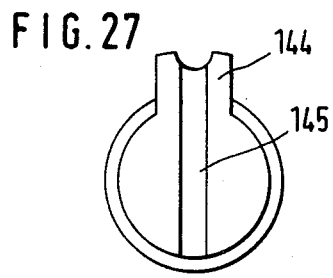
Figure 28:
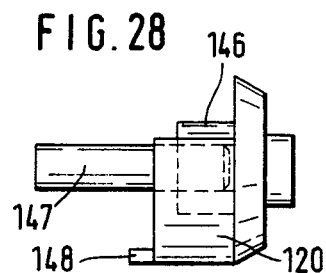
Figure 29:
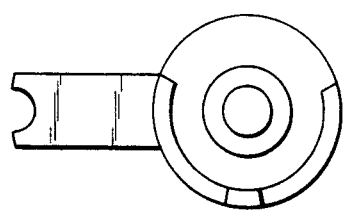
Figure 30:
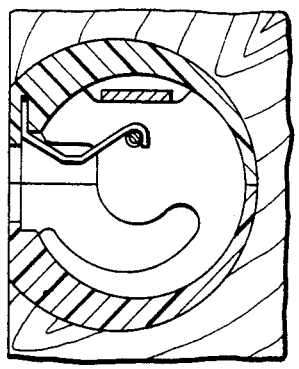
Figure 31:
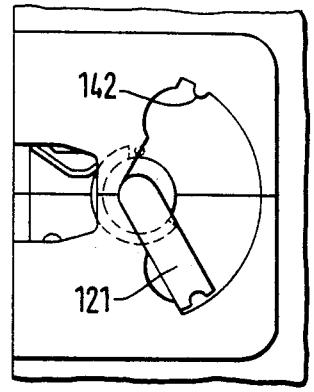
Figure 32:
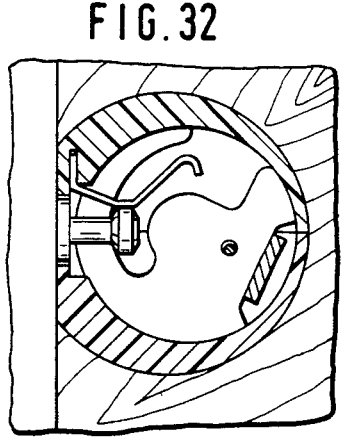
Figure 33:
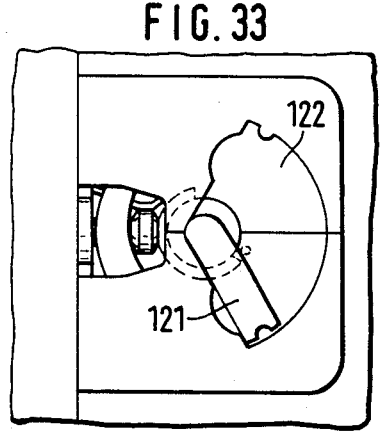
Figure 34:
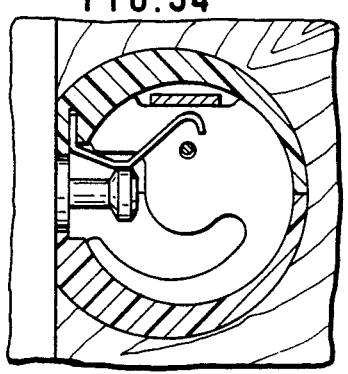
Figure 35:
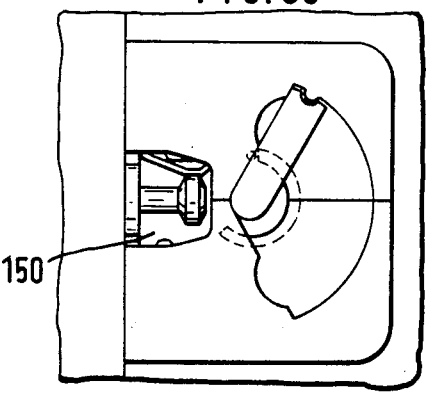
Figure 36:
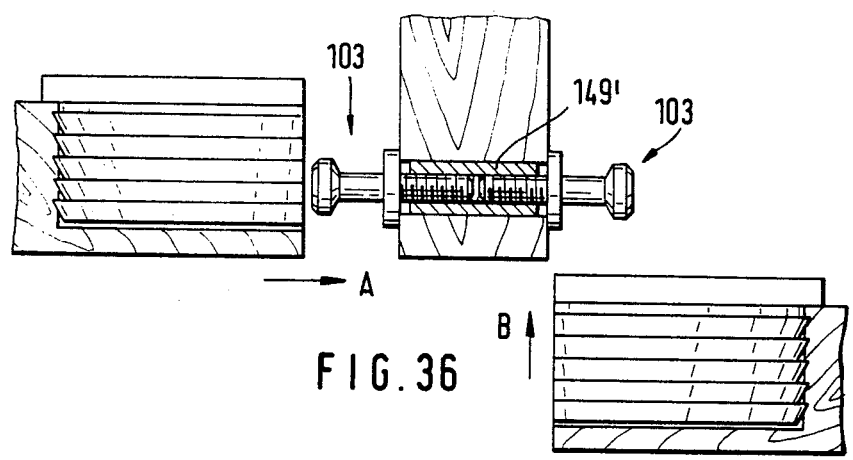
Figure 37:
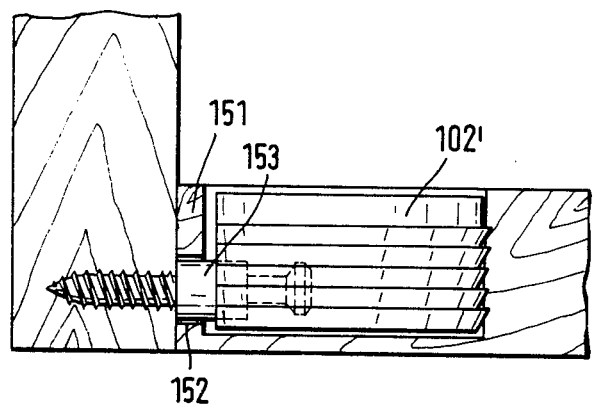
Figure 38:
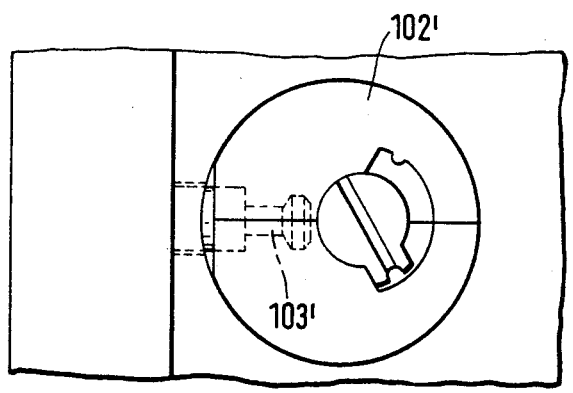
Figure 57:
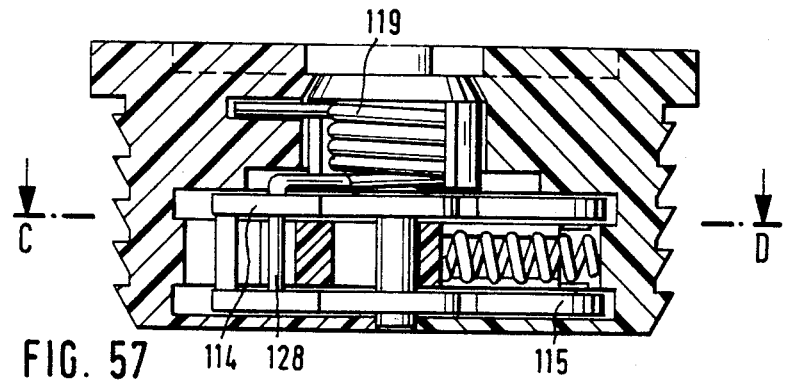
Figure 58:
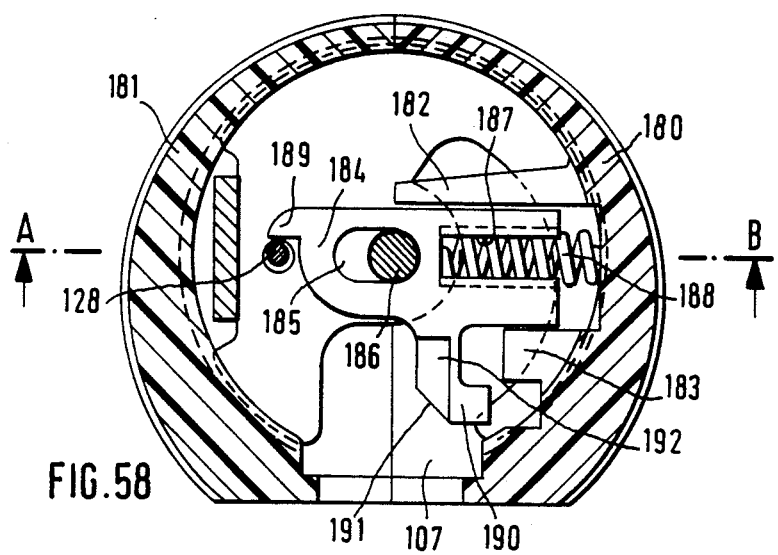
Figure 59:
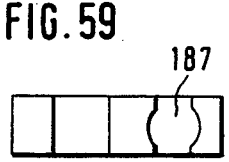
Figure 60:
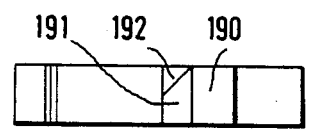

Illustrative embodiments of the invention will now be described more in detail with reference to the drawings, in which FIG. 1 is a side elevation showing that fitting element which is provided with the rotary wedge and comprises a housing, which is divided in a vertical center plane and one half of which has been omitted in the drawing, FIG. 2 is a horizontal sectional view taken on line II—II in FIG. 1 and showing the two housing halves removed from each other, FIG. 3 is a side elevation showing the fitting element which is provided with an eye for the rotary wedge, FIG. 4 is a side elevation showing the torsion spring by which the rotary wedge is loaded, FIG. 5 is a top plan view showing the leaf spring for locking the rotary wedge in its retracted position, FIG. 6 is a side elevation showing the leaf spring of FIG. 5, FIG. 7 is a horizontal sectional view showing the fitting elements with the rotary wedge in its retracted position, FIG. 8 is a top plan view showing the fitting elements of FIG. 7 with the handle lever in position for the assembling of the fitting, FIG. 9 is a horizontal sectional view which is similar to FIG. 7 and shows the fitting elements which have been pushed together and the rotary wedge in its retracted position, FIG. 10 is a top plan view showing the fitting elements of FIG. 9, FIG. 11 is a horizontal sectional view which is similar to FIGS. 7 and 9 and shows the rotary wedge held in its retracted position by the locked handle lever, FIG. 12 is a top plan view showing the fitting elements in the position shown in FIG. 11, FIG. 13 is a top plan view showing the rotary wedge, FIG. 14 is a bottom view showing the disc which is provided with the handle lever, FIG. 15 is a side elevation showing the disc of FIG. 14, FIG. 16 is a front elevation showing the fitting element provided with the eye, FIG. 17 is a side elevation showing the pivot pin carrying the rotary wedge, FIG. 18 is a longitudinal sectional view taken on line I—I of FIG. 19 and showing a different embodiment of a wedge housing, FIG. 19 is a horizontal sectional view taken on line II—II in FIG. 18 and showing the wedge housing, FIG. 20 is a side elevation showing the fitting element which consists of a headed pin, FIG. 21 is a top plan view showing the torsion spring, FIG. 22 is a side elevation showing the handle lever and the cylindrical housing for the torsion spring, FIG. 23 is a bottom view showing the handle lever of FIG. 22, FIG. 24 is a side elevation of a rotary wedge consisting of two discs, FIG. 25 is a top plan view showing the rotary wedge of FIG. 24, FIG. 26 is a side elevation showing a handle lever for actuating the rotary wedge, a housing for the torsion spring, and a pivot pin for the rotary wedge, FIG. 27 is a top plan view showing the handle lever of FIG. 26, FIG. 28 is a side elevation showing a further embodiment of a housing for the torsion spring, the handle lever and the pivot pin for the rotary wedge, FIG. 29 is a bottom view showing the spring housing of FIG. 28, FIGS. 30 and 31 are, respectively, a horizontal sectional view and a top plan view showing that fitting element which is provided with the rotary wedge in ready position, FIGS. 32 and 33 are views which are similar to FIGS. 30 and 31 and show the connecting fitting after the headed pin has effected a release of the rotary wedge and the latter has sprung to its locking position, FIGS. 34 and 35 are view which are similar to FIGS. 32 and 33 and show the connecting fitting with the handle lever locked in its retracted position so that the connecting fitting can be unlocked, FIG. 36 is a sectional view showing furniture members which are to be connected and comprise a vertical furniture wall having a through bore, into which two headed pins have been screwed from opposite sides, and horizontal furniture members to be connected to said pins by being displaced in their plane or transversely thereto, FIG. 37 is a sectional view showing two interconnected furniture members, one of which has a milled bore in which the fitting element provided with the rotary wedge is entirely accommodated, FIG. 38 is a top plan view showing the interconnected furniture members of FIG. 37, FIG. 39 is a sectional view taken on the parting plane of the wedge housing and showing two interconnected furniture members, FIG. 40 is a horizontal sectional view taken on line XXIII—XXIII of FIG. 39 and showing the wedge housing, FIG. 41 is a side elevation of the pivot pin for the rotary wedge and the handle lever, FIG. 42 is a top plan view showing the handle lever of FIG. 41, FIG. 43 is a top plan view showing the leaf spring having an end hook, FIG. 44 is a side elevation showing the leaf spring of FIG. 43, FIG. 45 is a side elevation showing the rotary wedge formed by a cylindrical wall, FIG. 46 is a top plan view showing the rotary wedge of FIG. 45, FIG. 47 is a side elevation showing the torsion spring, FIGS. 48 and 49 are, respectively, a horizontal sectional view and a top plan view showing the fitting element provided with the rotary wedge in its ready position, FIGS. 50 and 51 are views corresponding to FIGS. 48 and 49 and show the fitting element in its locking position, FIGS. 52 and 53 are views corresponding to FIGS. 50 and 51 and show the rotary wedge in its released position, FIGS. 54 and 55 are, respectively, a top plan view and a side elevation of a wedge housing which has been fitted into a furniture member and has a wedge-shaped ramp for locking the handle lever, FIG. 56 is a side elevation showing the pivot pin for the rotary wedge and the handle lever, FIG. 57 is a longitudinal sectional view taken on line A-B in FIG. 58 and showing another embodiment of a fitting element, FIG. 58 is a transverse sectional view taken on line C-D in FIG. 57, FIG. 59 is a rear elevation showing the slider of FIGS. 57 and 58, and FIG. 60 is a side elevation showing the slider of FIG. 59.

The connecting fitting shown in the drawings consists of a fitting element 1, which is provided with an eye 3, and a fitting element 2, which comprises the rotary wedge 4. The fitting elements 1 and 2 are provided with pot-shaped housings.

The fitting element 1 comprises two cheeks 5, 6, which are vertically spaced and vertically aligned and are interconnected by a pin 7, which defines the eye 3. The cheeks 5, 6 are anchored in the pot-shaped housing 8 in the manner which is apparent from FIG. 16. The pin 7 extends over a groove, which is formed in the housing 8. That groove has the shape of a segment of a circle. As a result, the movement of the rotary wedge 4 into the eye 3 defined by the pin 7 will not be obstructed.

The housing 8 of the fitting element 1 is provided with a flange 11, which defines a step 10, which constitutes a stop for engaging the fitting element 2.

The rotary wedge 4 is non-rotatably connected to the pin 12, which is rotatably mounted in the housing consisting of housing halves 13, 14. The housing 13, 14 has substantially the shape of a cylindrical disc and has a flat forward face 15. The pin 12 is mounted in the housing 13, 14 on an axis which is parallel to the longitudinal axis of the cylindrical housing. The flat forward surface 15 of the housing is formed with a slot. The rotary wedge 4 is mounted for rotation in a horizontal diametral plane and has a round wedge-shaped forward end portion 16, which is adapted to extend out through said slot.

A coiled torsion spring 17 is fitted on the lower end of the pin 12 and has one end leg 18, which bears on an abutment surface of the housing, and an angled second end leg 19, which extends into a slot 20 formed in the disc-shaped rotary wedge 4 and is radially displaceable in said slot 20 during a rotation of the rotary wedge 4.

The top end portion of the pin 12 extends through the top wall of the housing 13, 14 and carries a short lever arm 21, which lies on the upper surface of the housing. That lever arm 21 is covered by a rotary circular disc 22, which is formed on its underside with a sector-shaped recess 23, which accommodates the lever arm 21. The rotary disc 22 is provided at its lower edge with a beveled annular flange 24 and is rotatably mounted in that said flange is received in a mating undercut groove formed in the top surface of the housing. The rotary disc 22 is provided with a handle lever 25, which extends in a sector-shaped recess 26 in the top surface of the housing 13, 14. The sector angle of the recess 26 is at least as large as the sector angle of the recess 23.

As is best apparent from FIG. 13, the rotary wedge 4 consists of a disc, which has a wedge-shaped portion 16, which is curved according to an arc of a circle. The recess which defines the inside surface of the wedge-shaped portion is continued by an indentation 26, in which the U-shaped rear end 27 of the leaf spring 28 is anchored. The leaf spring 28 has a straight portion, from which a hook 29 is angled, which is continued by a curved tag 30, which is enlarged in width and is forked, as is apparent from FIG. 6.

The circular disc-shaped rotary wedge 4 has a central bore 31 and the pin 12 has a portion that is formed with scores 32 and non-rotatably connected to the rotary wedge 4 in the bore 31.

As is apparent from FIG. 2, the housing for the rotary wedge 4 is divided into the housing halves 13, 14 in an axial plane which bisects the flat forward surface 15. The housing 13, 14 has an approximately cylindrical cavity 33, which is open-bottomed and in which the pin 12 is approximately centrally mounted at one end in a web 34, which protrudes into the cavity, and at the other end in a bore formed in the top wall which defines the cavity. Respective halves of the bearing bores are formed in the housing halves 13, 14, so that the assembling is facilitated. The housing halves are provided with pins and mating recesses for connecting and centering the housing halves. The end leg 18 of the torsion spring 17 is held in a suitable blind hole 35 formed in the housing half 13.

The surface defining the cylindrical cavity 33 is formed with a circular groove 36, into which the rotary wedge 4 extends.

Adjacent to the flat forward face 15, the wall which defines the cavity 33 is formed with approximately right-angled edges 37, 38, which are disposed on both sides of the groove 36 and define the receiving opening 39. The hook 29 of the leaf spring 28 is adapted to interengage with the edge 37 in the manner which is apparent from FIG. 7 so that the rotary wedge 4 can be locked in its retracted position. In that position the tag 30 of the leaf spring 28 lies in the opening 39 for receiving the fitting element 1 so that in response to the insertion of the fitting element 1 the rotary wedge 4 will be released and the hook 29 will then be freely slidable over the edge between the groove 36 and the surface which defines the cavity 33.

As is apparent from FIGS. 8, 10 and 12, the handle lever 25 has a recess 40, which is adapted to receive the camlike projection 41, which is provided on the peripheral surface that defines the sector-shaped recess 26.

FIGS. 7 and 8 show the fitting elements in the position in which they are ready for being assembled. By means of the handle lever 25, the rotary wedge 4 has been turned to its retracted position so that the hook 29 of the leaf spring 28 has snapped behind the projection 37 of the housing and holds the rotary wedge 4 in its retracted position, which is shown in FIG. 7. The handle lever 25 is then turned back to the position shown in FIG. 8. When the fitting element 1 is then inserted, it will engage the tag 30 of the leaf spring 28 and will thus effect a release of the rotary wedge 4 so that the latter can spring to its locking position, shown in FIG. 9. As the lever 21 is free to move in the sector-shaped recess 23 of the rotary disc 22, the rotary wedge 4 will be free to move to its locking position. The tag 30 is forked, as is shown in FIG. 6, so that the rotary wedge extending through the tag 30 will not be restrained by the latter.

When it is desired to separate the fitting elements, the handle lever 25 is moved to its retaining position in that the cam 41 falls into the aperture 40, as is apparent from FIG. 12. When the rotary wedge 4 has subsequently released the pin 7, the tag 30 of the leaf spring 28 bears on the outside surface of the pin 7 so that the fitting elements can be pulled apart without an obstruction. When the fitting elements have been pulled apart, the hook 29 of the leaf spring 28 again snaps in behind the projection 37 of the housing so that the rotary wedge is locked in its retracted position, as is shown in FIG. 7. When it is desired to re-assemble the fitting, it is sufficient to turn the handle lever 25 from the position shown in FIG. 12 to the position shown in FIG. 8.

In the embodiment shown in FIGS. 18 to 23, the connecting fitting consists of the fitting element 102, which is provided with the rotary wedge, and the connecting fitting 103, which consists of a screw-threaded headed pin.

The fitting element 102 comprises a substantially cylindrical housing, which is centrally divided into the housing halves 104, 105 and which has a flat forward face 106, which is symmetrical to the parting plane of the housing. The flat forward face 106 has a central opening 107 for receiving the fitting element 103. The receiving opening 107 leads into a substantially cylindrical cavity 108, which is formed in the housing 104, 105 and in which the rotary wedge 101 is rotatably mounted. The rotary wedge 101 has been made by bending from a sheet metal stamping and comprises two parallel circular discs 109, 110 and a web 111 connecting said discs. The discs 109, 110 have punched crescent-shaped recesses 112, which define prongs 113, which extend along respective arcs of a circle. The discs 109, 110 have circular edges 114, 115, which are guided in annular grooves 116, 117 formed in the surface that defines the cylindrical cavity 108 of the housing 104, 105. The web 11 extends in recesses 118 formed in the peripheries of the discs 109, 110 so that the web cannot obstruct the insertion of the edges 114, 115 into the annular grooves 116, 117.

On top of the rotary wedge 101, a coiled torsion spring 119 is mounted, which is centered on the axis of rotation of the rotary wedge 101 and is surrounded by a cylindrical housing 120, which constitutes a pivot pin. A handle lever 121 is connected to the top of the housing 120 and extends at right angles to the axis of the housing 120 in a sector-shaped recess 122 of the top of the housing 104, 105. This recess 122 is apparent from FIGS. 31, 33 and 35.

The cylindrical housing 120 which contains the spring 119 is mounted in a mating cylindrical opening of the wedge housing 104, 105 and at its top edge has a frustoconical portion 123, which is embraced by the mating frustoconical inside surface of an edge portion 124 of the housing 104, 105 so that the spring housing 120 is rotatably and axially immovably mounted in the wedge housing 104, 105. The wall of the spring housing 120 has a part-sector-shaped aperture 125, through which the end legs of the torsion spring 119 extend. The torsion spring 119 has a radial or tangential upper end leg 126, which is held in a bore 127 of the housing half 105. The other end leg 128 of the torsion spring 119 is right-angled and extends through bores 129 in the discs 109, 110 of the rotary wedge 101.

A leaf spring 131 has one end 130, which is held in a recess formed in the housing half 105, and a free end portion formed with a hook 132. That hook 132 is arranged to hook over the pinlike end leg 128 in the ready position shown in FIG. 19, in which the wedge-shaped prong 113 has been retracted from the receiving opening 107.

As is apparent from FIG. 19, the intermediate portion 133 of the leaf spring 131 is offset or arcuate to form a beveled run-up ramp 134, which protrudes into the receiving opening 107.

The pin-shaped fitting element 103 comprises a shank 135, which carries an enlarged head 136, which has a slot for a screwdriver. At its lower end, the shank 135 is provided with a collar 136, which limits the depth to which the pin 103 can be screwed. On the side of the collar 136 which is opposite to the shank 135, the pin 103 comprises a screw portion 137, which is aligned with the shank 135 and formed with screw threads.

The cylindrical spring housing 120 contains a central pin 138, which extends through the coiled portion of the torsion spring 119.

That wall 140 of the cylindrical housing 120 which is disposed adjacent to the handle lever 121 has a vertical end face 139, the lower edge of which constitutes a stop for the angled spring leg 128, so that the rotary wedge 101 can be turned to its retracted position, shown in FIG. 19, by a turning of the handle lever 121.

When it is desired to connect the furniture members by means of the fitting elements 102, 103, the rotary wedge is turned by the handle lever 121 to its retracted position, which is apparent from FIGS. 19 and 30 and in which the hook 132 of the leaf spring 131 interengages with the vertical end leg 128 of the torsion spring 119. The handle lever 121 is then turned to the position shown in FIG. 31 so that it will not obstruct a movement of the rotary wedge to its locking position. When the head 136 is then inserted into the receiving opening 107 of the fitting element 102, the head will run up on the ramp portion 134 of the leaf spring 131 and will force back the latter until the hook 132 has been disengaged from the end leg 128. The rotary wedge 101 will then spring to its locked position, shown in FIG. 32. In that position, the head 136 bears on the apex of the curved portion of the leaf spring 131.

When the fitting elements are then to be unlocked, the handle lever 121 is turned to the position shown in FIG. 35, in which the recess 141 in its end face snaps over the projection 142 provided on the surface which defines the sector-shaped recess 122. During the movement to that position the edge 139 of the inside surface 140 of the calindrical housing 120 has carried and angled end leg 128 along and has thus turned the rotary wedge 101 to its retracted position, shown in FIG. 34. When the fitting element 102 is then pulled from the fitting element 103, the head 136 releases the leaf spring 131 so that the hook 132 can again snap behind the end leg 128, which constitutes a locking pin. As the rotary wedge 101 is now locked in its retracted position, the handle lever 121 can be turned back from the position shown in FIG. 35 to that shown in FIG. 31.

The rotary wedge shown in FIGS. 24 and 25 differs from the rotary wedge shown in FIGS. 18 and 19 only by the provision of the central bore 142, with which the rotary wedge is mounted on the extended central pin 143 of the calindrical housing 120 for the torsion spring. As the rotary wedge is rotatably mounted on the pin 143, there is no need for guide grooves in the surfaces defining the calindrical cavity of the wedge housing so that the circular edges of the rotary wedge can bear directly on the surface which defines that cylindrical cavity.

In the embodiment shown in FIGS. 26 and 27 the lockable lever 144 for moving the rotary wedge to its retracted position is only short and the housing 120 can be rotated by means of a screwdriver inserted into a slot 145 in the top surface of the housing 120.

In the embodiment shown in FIGS. 28 and 29 the central pin is stepped and comprises a portion 146, which is larger in diameter and extends through the torsion spring, and a thinner portion 147, on which the rotary wedge is mounted. The wall of the housing 120 is provided on its outside edge with a tooth 148, which engages the bottom 149 of the recess 112 formed in the rotary wedge in order to carry the same along to its retracted position during a corresponding rotation of the handle lever.

In the embodiment shown in FIG. 36, a sleeve 149 is inserted in a through bore of a vertical furniture wall and fitting elements 103 having standard, e.g., metric screw threads are screwed into said sleeve 149 from opposite ends thereof. As the housings are provided in their top with apertures 150, shown in FIGS. 31, 33, 35, the horizontal furniture members can be interlocked with the fitting elements 103 by a displacement in their own plane in the direction of the arrow A and by a displacement in the direction indicated by the arrow B that is transverse to their own plane.

The embodiment shown in FIGS. 37 and 38 comprises a substantially cylindrical fitting element 102′, which is provided with the rotary wedge and entirely fitted in a milled hollow-cylindrical recess of the furniture member. The land 151 between the recess and the end face of the furniture member is formed with a bore 152, which is aligned with the receiving opening of the fitting element 102′. The fitting element 102′ can then be pushed into the fitting element 103′. The fitting element 103′ has a portion 153, which is larger in diameter and extends through the bore 152 and the receiving opening 107.

In the embodiment shown in FIGS. 41 to 56, the rotary wedge consists of a wedge-shaped cylindrical wall 154 carried by a rotary disc 155, which is freely rotatably mounted on a vertical pin 156 in a wedge housing. The pin 156 is surrounded by the coiled portion of the torsion spring 157, one end leg 158 of which is held in a recess of the housing. The other end leg 159 of the torsion spring is right-angled and held in a bore 160 of the rotary disc 155. The pin 156 is connected to a handle lever 161, which is disposed on the top of the housing, and is also connected to a disc 162, which is disposed below the top of the housing. The disc 162 has a radial stop 163, which cooperates with the angled leg 159 of the torsion spring 157, which end leg extends through the bore 160. The rotary disc 155 has a part-sector-shaped recess 164, one end of which defines the lowest portion of the rotary wedge that is formed by the wall 154.

An opening for receiving the fitting element 103 is provided in the top of the housing and extends parallel to the pin 156.

A leaf spring 165 is connected to the wall 154 carried by the disc 155 and has a free end portion formed with a hook 166, which is continued by a curved tag 167. In the retracted position of the rotary wedge, the hook 166 snaps in behind a steplike stop 168, which is formed in the wedge housing beside the receiving opening, and the sector-shaped recess 164 of the disc 155 is disposed adjacent to the receiving opening so that only the tag 167 which extends from the hook 166 is exposed through the receiving opening.

FIGS. 48 and 49 show the fitting element provided with the rotary wedge in its ready position. As the fitting element 103 is inserted into the receiving opening 169, the head of the fitting element 103 strikes against the tag 167 so that the latter yields radially and disengages the step 168 and the torsion spring then moves the rotary wedge to its lockings position, which is shown in FIGS. 50 and 51 and in which the rotary wedge engages the underside of the head of the fitting element 103 to lock the latter in the manner shown in FIG. 39.

When it is desired to unlock the fitting elements, the handle lever 161 is turned to the position which is apparent from FIG. 53 and in which its angled portion 170, which overlaps the edge of the housing, snaps behind the projection 171 formed on the edge of the housing. During the movement to this position the stop 163 of the disc 162 has turned by means of the end leg 159 the disc 155 and the rotary wedge to the retracted position, which is shown in FIG. 52. When the fitting element provided with the rotary wedge is then pulled from the fitting element 103, the hook 166 of the leaf spring snaps in behind the step 168 in the position shown in FIG. 48 so that the rotary wedge is locked in its retracted position. When the connecting fitting is to be re-assembled, the handle lever 161 is forced back over the camlike projection 171.

In the embodiment shown in FIGS. 54 to 56, a wegelike ramp 173 is provided on the surface of the sector-shaped recess which is formed in the top surface of the housing and accommodates the handle lever 172. When the rotary wedge has been moved to its retracted position, the resilient handle lever 172 snaps behind the step 174 of said ramp. To move the fitting element to its ready position, the resilient handle lever 172 must be moved over the step 174 of the ramp 173.

As the housings and handle levers consist of plastic material, the handle levers may be elastically deformed to assume the position in which they lock the rotary wedge in its retracted position.

In the embodiment shown in FIGS. 57 to 60, the rotary wedge housing consists of the halves 180 and 181 and the side wall of the housing half 180 has two bar-shaped extensions 182, 183, which have parallel inside surfaces, which form a track for a slider 184 held between them. The slider 184 has a slot 185. The two rotary wedge discs 114, 115 are rotatably mounted in the housing 180, 181 by means of a pivot pin 186, which extends through the slot 185. Apart from the slider 184 and its track, the fitting element shown in FIGS. 57 and 58, inclusive of the arrangement of the torsion spring 119, agrees with the fitting element shown in FIGS. 18 and 19.

The slider 184 has a rectangular portion, which is guided between the bars 182 and 183 and which is formed with an elongated recess 187, in which a compression spring 188 is held. One end of said spring bears on the bottom of the recess 187 and its other end bears on the wall of the housing half 180. At its forward end, the slider 184 has a projecting nose 189, which constitutes a stop for the angled end leg 128 of the spring 119 and thus locks the rotary wedge in the ready position which is shown.

An extension 190 of the slider 184 is exposed through the opening 107 for receiving the other fitting element and has wedge-shaped beveled surfaces 191 and 192 extending in respective directions in which the other fitting element can be inserted and which cross each other at right angles. As the other fitting element is inserted into the receiving opening 107, the beveled surface 191 or 192 slides on said other fitting element so that the slider 184 is forced back and its nose 189 releases the end leg 128. After this release, the rotary wedge can spring to its locking position.

What is claimed is:

1. A connecting fitting for releasably connecting two platelike furniture members, which preferably extend at right angles to each other, comprising two fitting elements which are adapted to be secured to respective ones of the furniture members to be connected, wherein one of said fitting elements has a locking projection and is adapted to be slidably inserted into a receiving opening of the other fitting element until the fitting elements and/or furniture members engage each other, and the other fitting element is provided with a hook-shaped rotary wedge for interengaging with the projection so as to lock the fitting elements to each other, characterized in that the rotary wedge is rotatably mounted in a wedge housing and is biased in a locking sense by a torsion spring, and that unlocking means are provided to rotate the rotary wedge in a retracting sense as well as resilient means for locking the rotary wedge in its retracted position, which resilient means are arranged to release the rotary wedge in response to the insertion of the projection of the other fitting element.

2. A connecting fitting according to claim 1, characterized in that the torsion spring consists of a coiled spring, which is fitted on a pivot pin for the rotary wedge and has end legs which are respectively held on the disc-shaped rotary wedge and on a portion of the housing.

3. A connecting fitting according to claim 1, characterized in that the actuating means for unlocking the rotary wedge consist of a lever, which is secured to the pin and extends at right angles thereto and lies on the upper surface of the top wall of the wedge housing.

4. A connecting fitting according to claim 3, characterized in that a disc provided with a handle lever is pivoted in the top wall of the wedge housing and is centered on the axis of the pin and has a sector-shaped recess, which extends over the lever, which is secured to the pin.

5. A connecting fitting according to claim 4, characterized in that the disc is provided with a beveled edge and is rotatably mounted in a mating undercut groove formed in the top wall of the wedge housing, the handle lever connected to the disc extends in a sector-shaped recess formed in the top surface of the wedge housing, and the handle lever is formed at one end with a recess, which in the retracted position of the rotary wedge receives a projecting cam that is provided at the peripheral edge of the sector-shaped recess.

6. A connecting fitting according to claim 1, characterized in that the locking means comprise a leaf spring, which is secured at one end to the rotary wedge and at its other end has a hook-shaped portion, which in the retracted position of the rotary wedge snaps behind a protruding portion of the housing.

7. A connecting fitting according to claim 6, characterized in that the hook-shaped portion is provided with an outwardly extending tag, which extends in the opening that is formed in the other fitting element.

8. A connecting fitting according to claim 1, characterized in that the locking projection consists of two spaced apart, aligned cheeks, which carry a pin that is parallel to the axis of rotation of the rotary wedge and defines a locking eye.

9. A connecting fitting according to claim 1, characterized in that that fitting element which has an interengageable projection consists of a pin, which has an enlarged head, and the rotary wedge consists of two discs, which extend in spaced apart, parallel planes and are provided with prongs, which are curved along arcs of a circle and straddle the shank of the pin behind the head and are supported on and forced against the rear face of the head.

10. A connecting fitting according to claim 9, characterized in that the discs of the rotary wedge have circular edges and the rotary wedge is rotatably mounted in that said circular edges are guided in annular grooves of the pot-shaped housing which accommodates said discs.

11. A connecting fitting according to claim 9 or 10, characterized in that the rotary wedge is a channel-shaped member made from a sheet metal stamping and the web which connects the discs of the rotary wedge suitably lies within the circular periphery.

12. A connecting fitting according to claim 11, characterized in that the torsion spring consists of a coiled spring having an axis which coincides with the axes of rotation of the rotary wedge, the torsion spring is disposed in an opening in the housing above the rotary wedge, one end leg of the torsion spring is held in an opening in the housing, and the other end leg of the torsion spring is right-angled and extends into a hole in the rotary wedge.

13. A connecting fitting according to claim 1, characterized in that one end of a leaf spring is secured in the housing and said leaf spring has a free portion, which is provided at its end with a hook and which is resilient in a plane that is parallel to the rotary wedge, the rotary wedge is provided with a pin or projection, which is adapted to interengage with the hook when the fitting element is in a ready position, in which the rotary wedge is swung back from the receiving opening, and an intermediate portion of the leaf spring is exposed in a sufficient length through the receiving opening that the other fitting element will effect a release as it is inserted.

14. A connecting fitting according to claim 13, characterized in that the pin is formed by the angled end leg of the torsion spring.

15. A connecting fitting according to claim 13 or 14, characterized in that the intermediate portion of the leaf spring is curved or is angled twice to form a run-up ramp for the head.

16. A connecting fitting according to claim 15, characterized in that rotary wedge is mounted in the housing on an axial pin which extends through a central bore of the rotary wedge.

17. A connecting fitting according to claim 16, characterized in that the housing has a cylindrical opening, which accommodates the rotary wedge, and the latter has disc-shaped elements having peripheral surfaces, which bear on the surface defining said opening under load or when subjected to canting forces.

18. A connecting fitting according to claim 17, characterized in that an axial pin is mounted in the top wall of the housing and carries the unlocking lever, which is disposed on the top of the housing, and the pin is provided at its lower end with a stop for cooperating with a stop of the rotary wedge in such a manner that the unlocking lever may be used to turn the rotary wedge to its retracted position.

19. A connecting fitting according to claim 18, characterized in that the pin is hollow-cylindrical and surrounds the coiled portion of the torsion spring and is formed with a sector-shaped aperture through which the end legs extend.

20. A connecting fitting according to claim 19, characterized in that the hollow-cylindrical, pot-shaped portion of the pin has a beveled edge portion, which contacts a mating beveled edge portion of the top wall of the housing.

21. A connecting fitting according to claim 20, characterized in that a pin is concentrically mounted in the cylindrical housing and extends through the torsion spring and the rotary wedge is mounted on said pin.

22. A connecting fitting according to claim 21, characterized in that the pin has an enlarged portion for holding the spring and a thinner portion for mounting the rotary wedge.

23. A connecting fitting according to claim 22, characterized in that a toothlike projection for actuating the rotary wedge is provided on the peripheral edge of the cylindrical housing and extends into the bottom of a recess which defines the inside surfaces of the curved wedge-shaped prongs in the discs.

24. A connecting fitting according to claim 23, characterized in that the handle lever is disposed in a sector-shaped recess in the top surface of the housing and is provided adjacent to its vertical pivotal axis with a slot for a screwdriver.

25. A connecting fitting according to claim 1, characterized in that the disc is rotatably mounted in the wedge housing on a mounting pin, which is parallel to the center line of the wedge housing, and said disc has a cylindrical side wall, which increases in height in wedge shape and constitutes the rotary wedge, which extends into the opening that is intended to receive the headed fitting element.

26. A connecting fitting according to claim 25, characterized in that the disc has a sector-shaped portion which is not provided with said side wall and which receives a radially outwardly extending, hook-shaped end of a leaf spring, which at its end opposite to the hook is secured to the cylindrical side wall, the housing has an inside surface, which surrounds the disc and is formed laterally of the receiving opening with a step, which is engageable by the lever in the ready position, and the hook has a tag, which extends laterally to be exposed through the receiving opening.

27. A connecting fitting according to claim 26, characterized in that the disc is freely rotatably mounted on a pin, which extends through a torsion spring, which has one end leg that is held in the housing wall and another end leg that is held at the disc.

28. A connecting fitting according to claim 27, characterized in that the pin is provided with the handle lever, which is disposed on the top of the housing, and with a disc, which has a stop that defines a sector-shaped recess and cooperates with a stop on the disc carrying the rotary wedge in order to turn the latter.

29. A connecting fitting according to claim 28, characterized in that the stop is formed by the angled end leg of the torsion spring, which extends through a bore of the disc carrying the rotary wedge.

30. A connecting fitting according to claim 29, characterized in that the handle lever extends in a sector-shaped recess in the top surface of the housing and has an angled end portion, which extends over the edge of the housing and during the pivotal movement of the rotary wedge to the retracted position snaps behind a projection on the side wall of the housing.

31. A connecting fitting according to claim 30, characterized in that the handle lever is disposed in a sector-shaped recess in the top surface of the housing, the bottom of said recess is provided with a wedge-shaped elevation and the handle lever is adapted to snap behind said elevation in the retracted position of the rotary wedge.

32. A connecting fitting according to claim 1, characterized in that a slider is provided, which is guided in the wedge housing in a plane which is parallel to the rotary wedge, said slider is adapted to be forced back against the force of a spring and is provided with a stop for locking the rotary wedge in its retracted position, and with a beveled surface, which serves to unlock the rotary wedge and is exposed through the receiving opening and adapted to be forced back by the other fitting element.

33. A connecting fitting according to claim 32, characterized in that the slider has a slot for guiding the slider on the pivot pin for the rotary wedge.

34. A connecting fitting according to claim 33, characterized in that the slider is guided between two parallel bars, which are connected to the housing, and a compression spring is held in a recess of the slider and bears at one end on the wall of the housing and at the other end on the bottom of the recess.

35. A connecting fitting according to claim 34, characterized in that that portion of the slider which in the ready position of the fitting element is exposed through the receiving opening is beveled in the direction which is transverse to the axis of rotation of the rotary wedge and in a direction which is parallel to said axis of rotation, in which directions the other fitting element is adapted to be inserted.

* * * * *